Jan. 19, 1954   J. W. BATCHELDER   2,666,349
SCREW THREAD ROLLING MACHINE
Filed Dec. 17, 1947   10 Sheets-Sheet 1

INVENTOR.
James W. Batchelder
BY
ATTYS.

Jan. 19, 1954   J. W. BATCHELDER   2,666,349
SCREW THREAD ROLLING MACHINE
Filed Dec. 17, 1947   10 Sheets-Sheet 3

INVENTOR.
James W. Batchelder

Jan. 19, 1954     J. W. BATCHELDER     2,666,349
SCREW THREAD ROLLING MACHINE

Filed Dec. 17, 1947     10 Sheets-Sheet 5

INVENTOR.
James W. Batchelder

Jan. 19, 1954 J. W. BATCHELDER 2,666,349
SCREW THREAD ROLLING MACHINE
Filed Dec. 17, 1947 10 Sheets-Sheet 6

INVENTOR.
James W. Batchelder
BY Wright, Brown, Quinby & May
Attys.

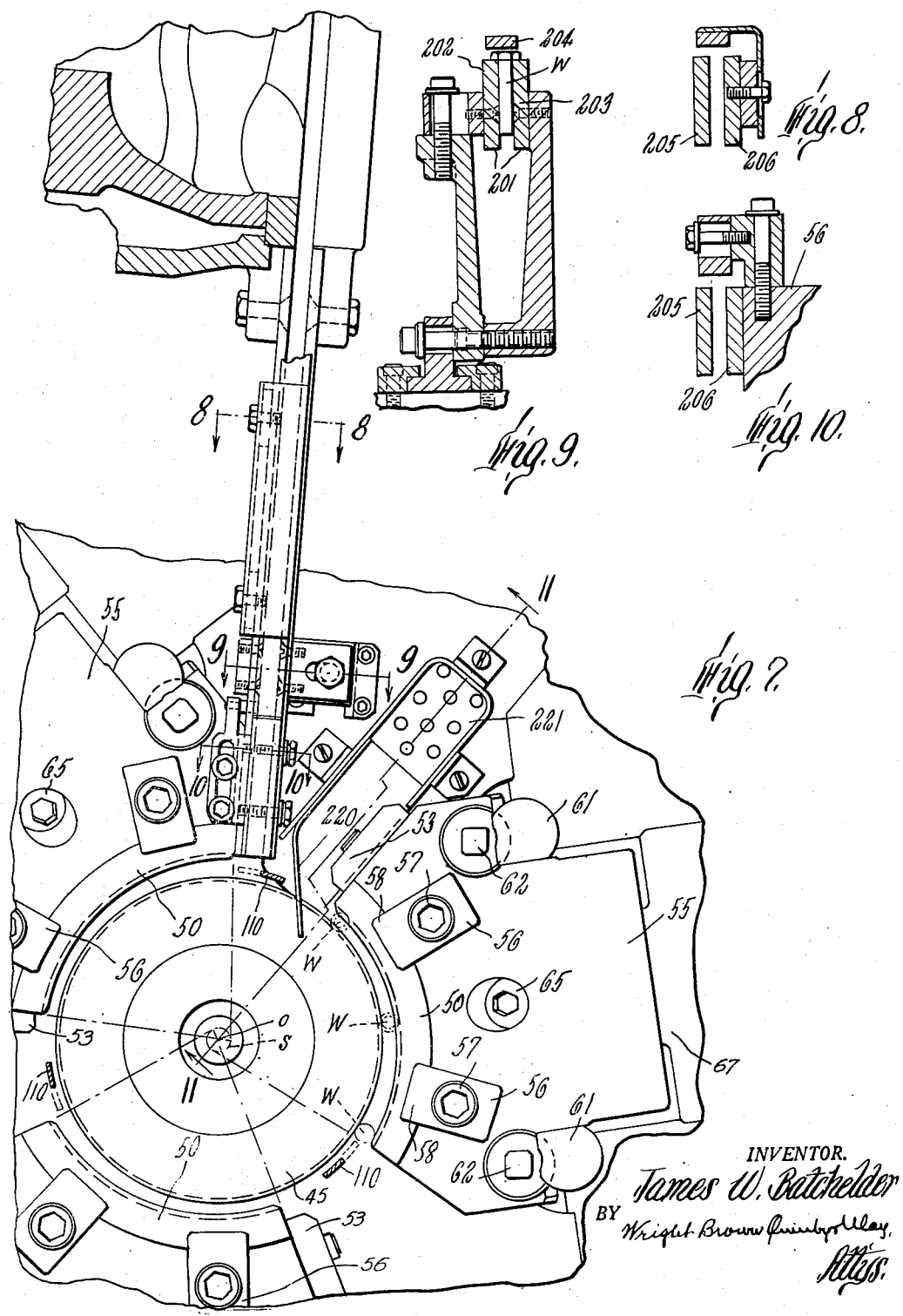

Jan. 19, 1954      J. W. BATCHELDER      2,666,349
SCREW THREAD ROLLING MACHINE
Filed Dec. 17, 1947      10 Sheets-Sheet 9
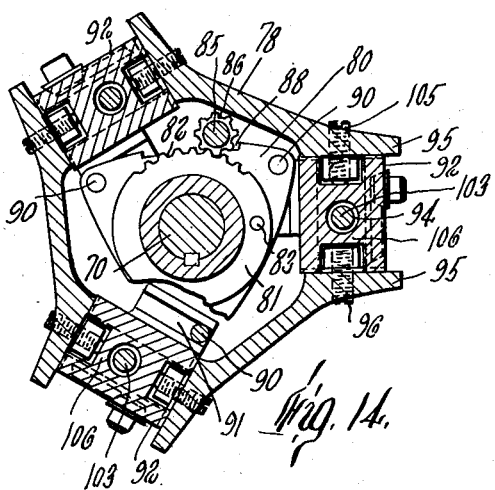
Fig. 14.
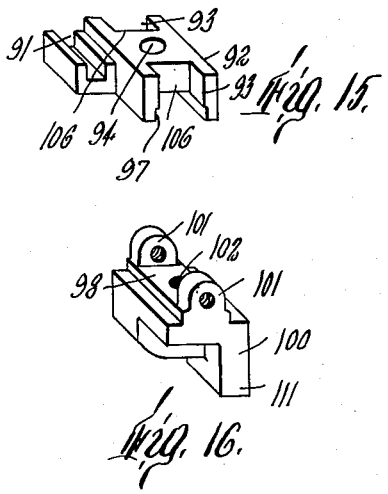
Fig. 15.
Fig. 16.
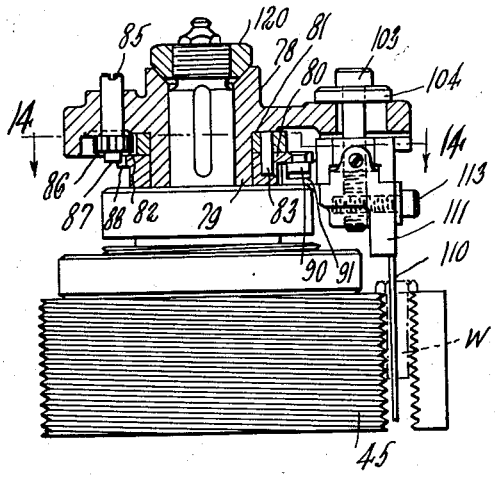
Fig. 12.
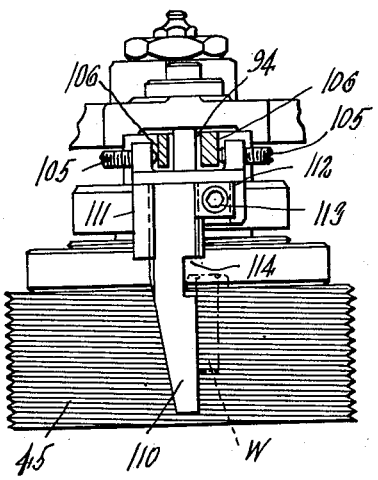
Fig. 13.
INVENTOR.
James W. Batchelder
BY Wright, Brown, Quimby & May,
Attys.

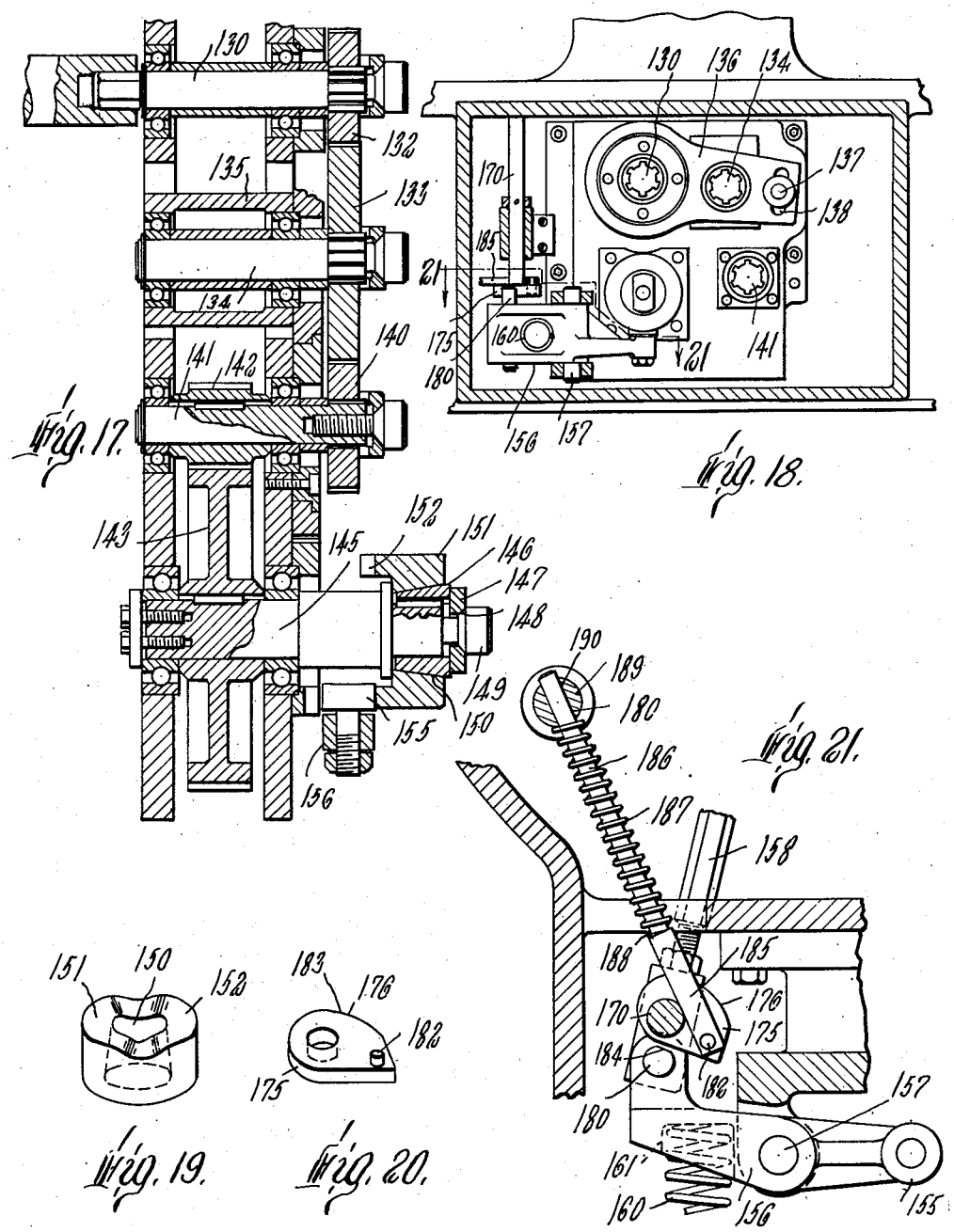

Patented Jan. 19, 1954

2,666,349

UNITED STATES PATENT OFFICE 2,666,349

SCREW THREAD ROLLING MACHINE

James W. Batchelder, Weathersfield, Vt., assignor, by mesne assignments, to The Economy Engineering Company, Willoughby, Ohio, a corporation of Ohio Application December 17, 1947, Serial No. 792,296

14 Claims. (Cl. 80—7)

1

This invention relates to thread rolling and a machine therefor.

One object of the invention is to provide a machine of this type, wherein a plurality of work pieces are thread rolled simultaneously between a central rotary die and stationary dies spaced angularly about the central die, and by which the pressures on the central die are substantially equalized.

A further object is to provide improved means for feeding the work pieces simultaneously into thread rolling position between the inner die and a plurality of outer dies.

Still another object is to so support the inner die that it can successfully roll threads to size even though only one work piece is presented thereto at one time.

A further object is to provide a thread rolling machine in which the axes of the die and of the work are vertical.

Still another object is to provide a machine in which the work feeding mechanisms are each identical with the others.

A further object is to provide means for introducing the work piece or pieces between a moving and one or more stationary dies at a velocity very nearly equal to the velocity at which the axis of each piece will travel between the dies during the thread rolling operation, this velocity being termed herein the "differential velocity" since it is less than that of the thread rolling surface of the moving die.

A further object is to provide improved means for properly phasing the dies, the dies being set where preferred, the instant when the work is gripped by the mating dies being adjusted to suit the die setting.

Another object is to mount the outer dies rigidly, adjustment of the time of introducing the work pieces between the dies obviating the necessity of any endwise or vertical adjustment of these dies.

A further object is to provide yielding means for introducing the work pieces between the cooperating dies, this providing automatic relief in case of undue resistance to the thread rolling operation as where the work pieces might be of too large diameter.

Still another object is to provide means for adjusting the work-introducing means relative to its actuating mechanism in setting up the machine so as to provide for the desired differential speed of feed of the work piece at the time it is gripped between the dies for the thread-rolling operation.

2

Further objects and advantages will appear from a description of an embodiment of the invention shown in the accompanying drawings in which Figure 1 is a top plan view with parts broken away of a thread rolling machine embodying the invention.

Figure 3:
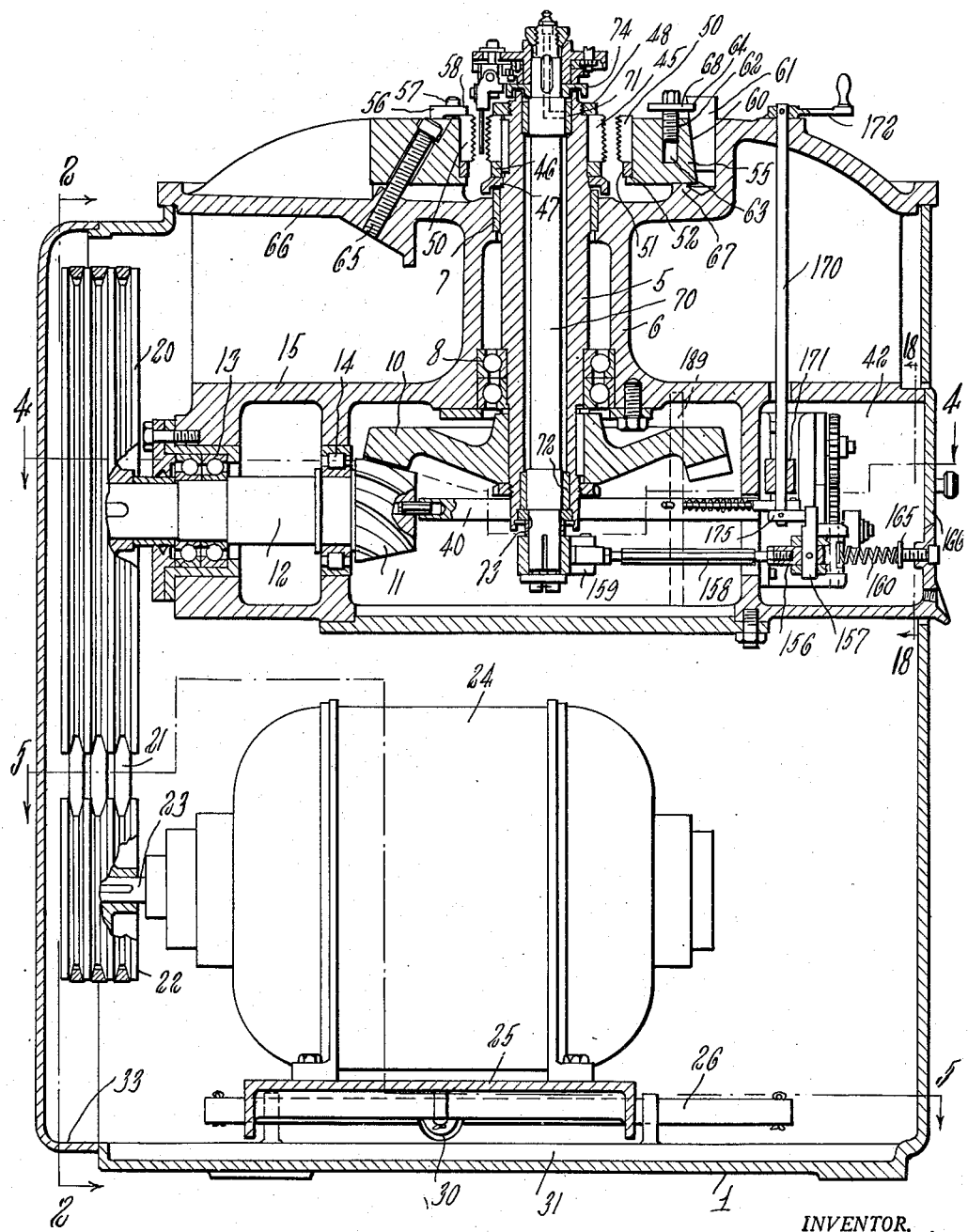
Figure 3 is a vertical sectional view on line 3—3 of Figure 2.
Figure 4:
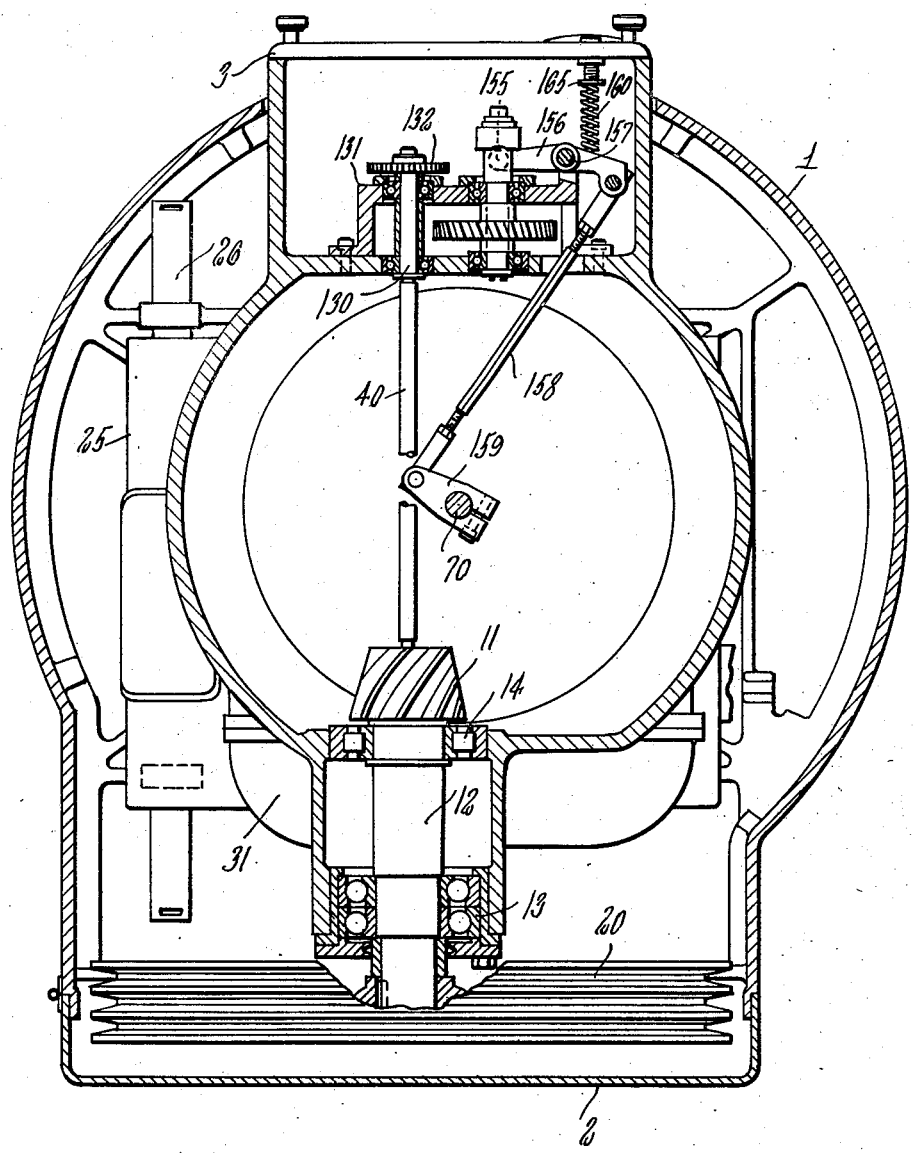
Figure 5:
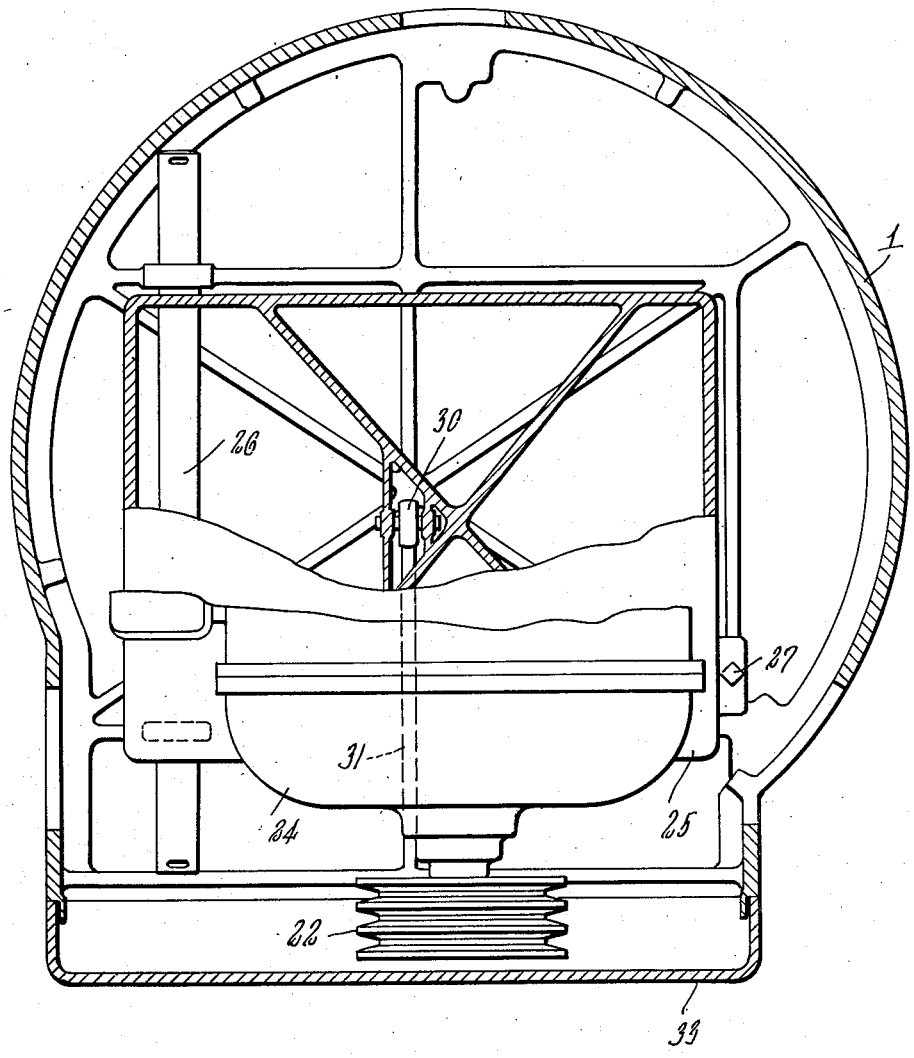

Figures 4 and 5 are horizontal sectional views on lines 4—4 and 5—5, respectively, of Figure 3.

Figure 2:
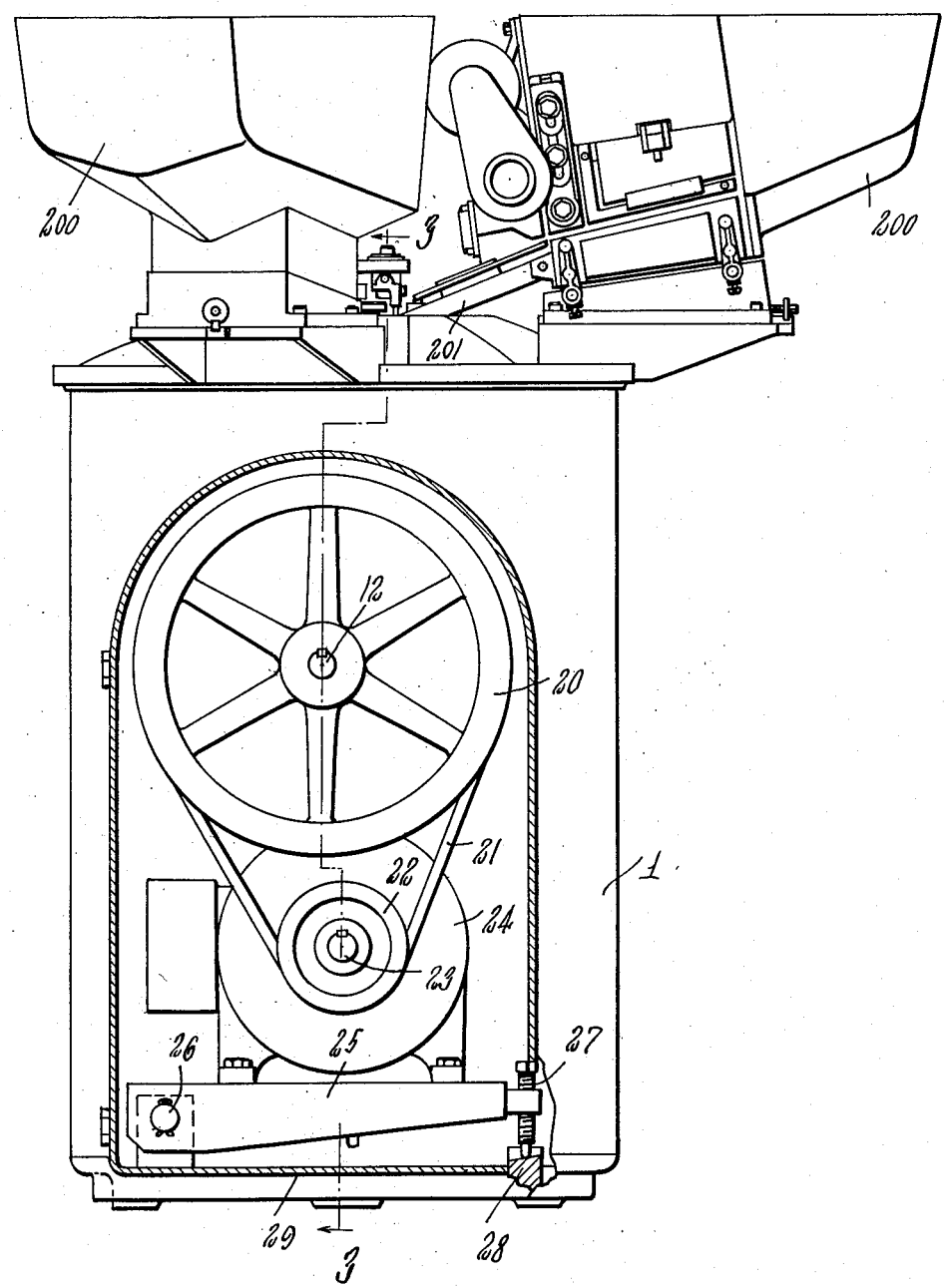
Figure 2 is a side elevation of the machine, a portion of the casing housing the drive mechanism being shown in section.
Figure 6:
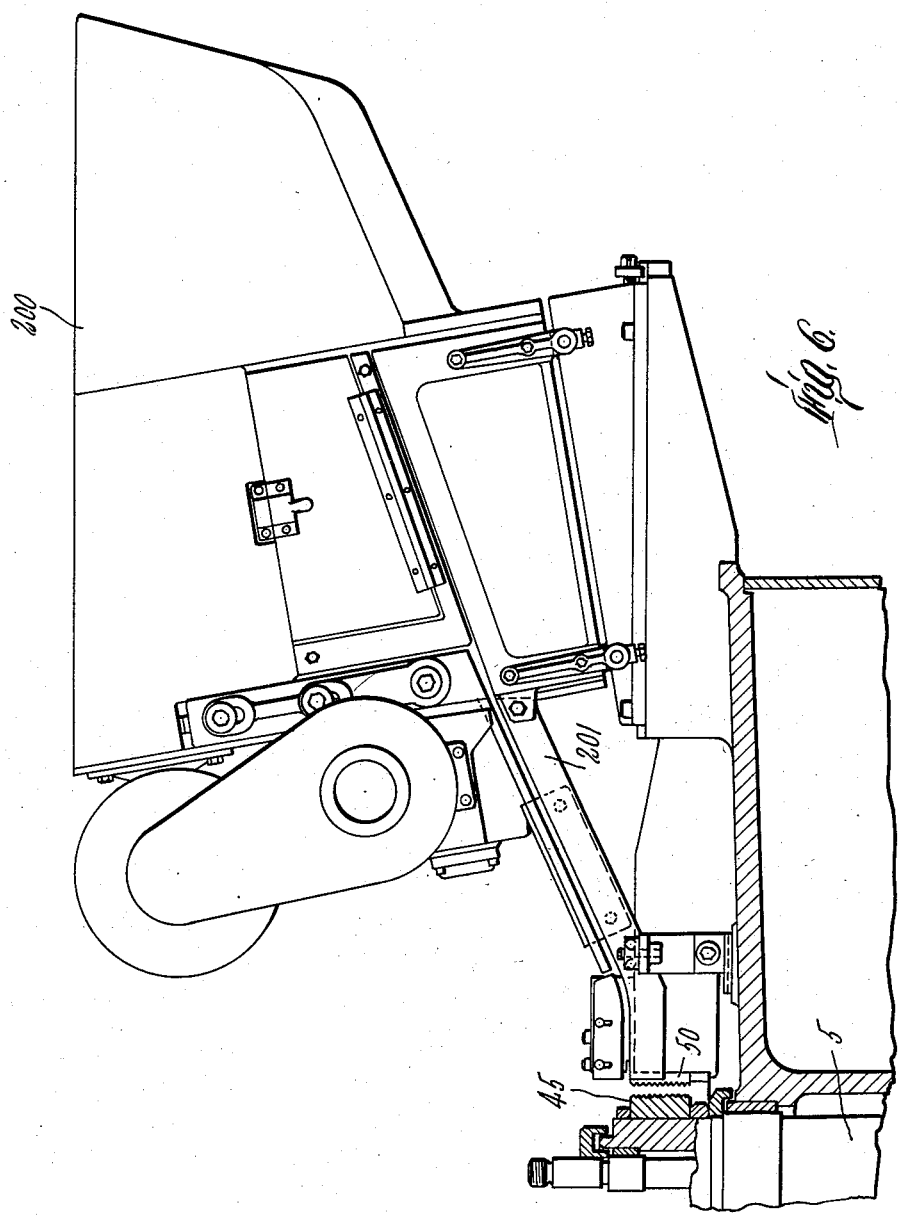

Figure 6 is a view similar to a portion of Figure 2, but to a larger scale.

Figure 1:
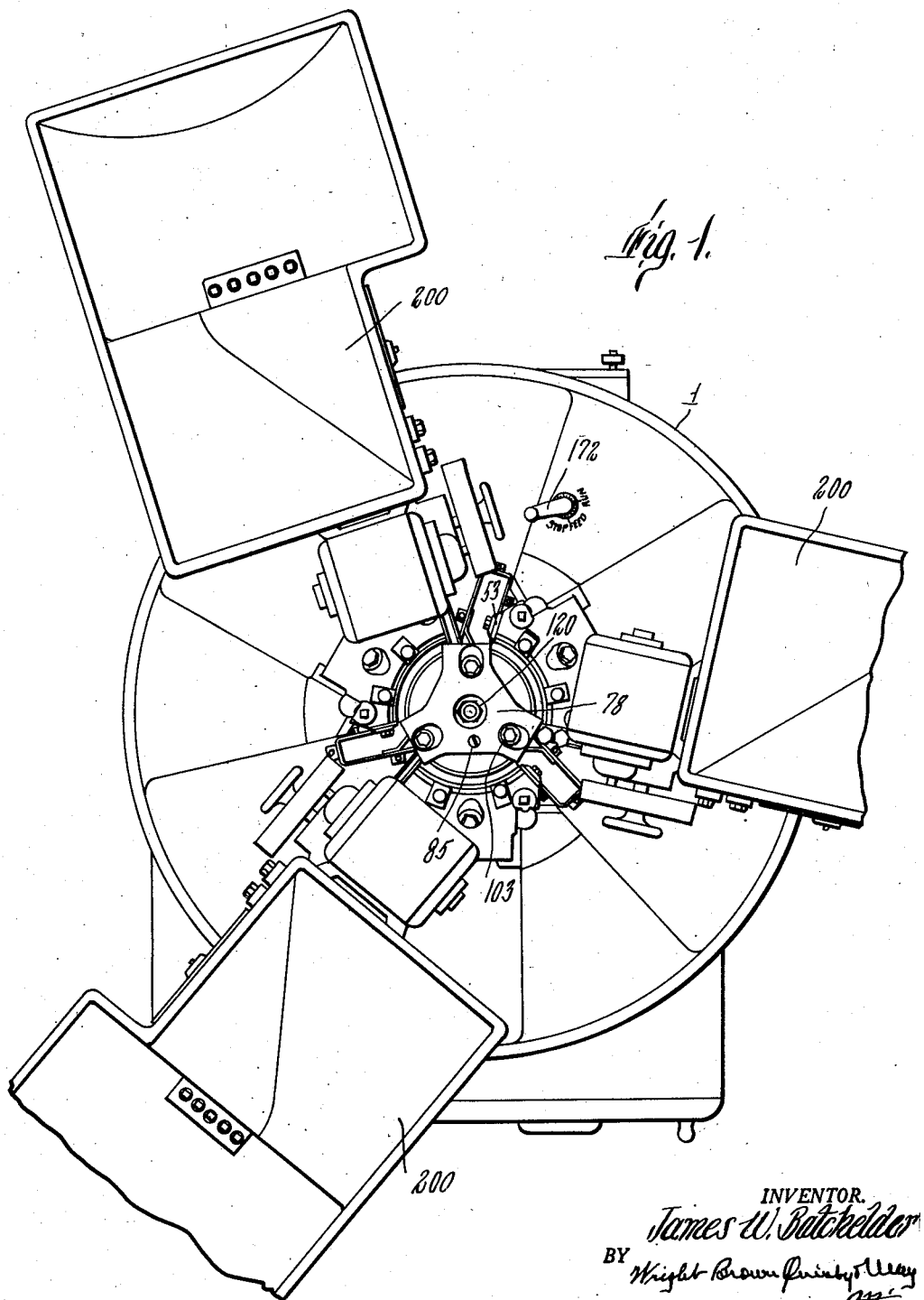

Figure 7 is a view to a larger scale of the parts shown in Figure 1.

Figure 11:
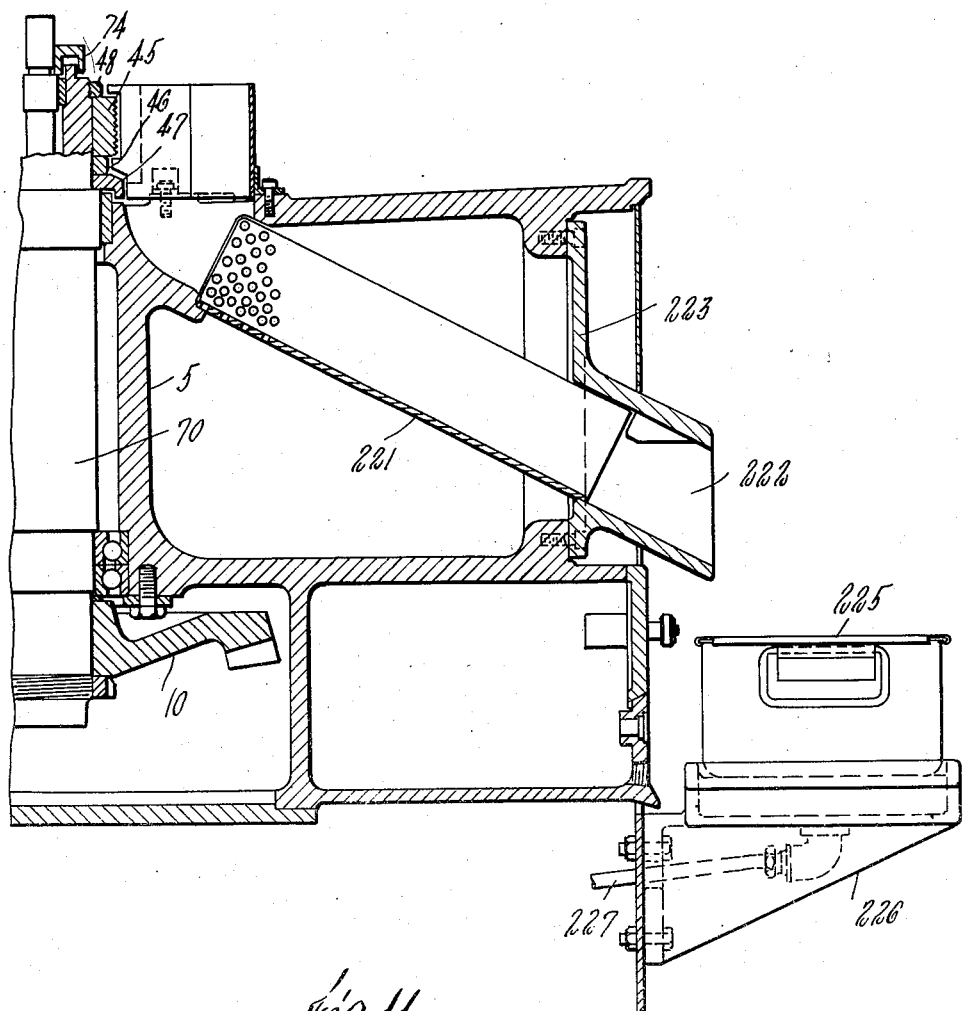

Figures 8, 9, 10 and 11 are detail sectional views on the correspondingly numbered section lines of Figure 7, Figures 8, 9 and 10 being to a larger scale and Figure 11 to a smaller scale.

Figure 12 is a fragmentary view partly in elevation and partly in section of the central die and its mounting, one of the outer dies being also shown.

Figure 13 is a view similar to Figure 12, but taken at right angles thereto.

Figure 14 is a detail sectional view on line 14—14 of Figure 12.

Figures 15 and 16 are perspective views of certain of the parts shown in Figures 12 to 14, inclusive.

Figure 17 is a developed sectional view of the change gears and pusher actuating cam.

Figure 18 is a detail sectional view on line 18—18 of Figure 3.

Figure 19 is a perspective view of the pusher cam.

Figure 20 is a similar view of the jack cam.

Figure 21 is a detail sectional view on line 21—21 of Figure 18, but to a larger scale.

Referring first to Figures 1 to 5, the machine comprises a generally cylindrical base 1 arranged with its axis vertical and provided with a pair of generally opposed rectangular extensions 2 and 3 for a portion of its height. Centrally disposed vertically within this base is a tubular shaft 5 mounted for rotation within a tubular frame portion 6 on upper and lower bearings 7 and 8. This shaft 5 has keyed to its lower portion a relatively large diameter bevel gear 10. As shown this gear is of the hypoid type and meshing therewith is a bevel pinion 11 carried by a drive shaft 12 mounted in suitable bearings 13 and 14 in a transverse horizontal box-like portion 15. The outer end of the shaft 12 projects into the extension 2 and has fixed thereto within this extension a multiple V belt pulley 20 connected through a multiple V belt 21 with a driving pulley 22 fixed to the shaft 23 of a motor 24. This motor 24 is supported beneath the box-like portion 15, and as shown best in Figure 2 is mounted on a platform 25 pivoted on a cross shaft 26 at one side and supported on its other side by a jack screw 27, the lower end of which engages an abutment 28 in the bottom wall 29 of the machine base. By adjustment of the screw 27, the tension of the belt 21 may be adjusted, the weight of the motor tending to hold the screw 27 in contact with the abutment 28.

The platform 25 is provided with a roller 30 on its under face, which, by lowering the jack 27, may be let down upon a rib 31 (see Figure 5) on the base plate of the machine which serves as a track and bears most of the weight of the motor. This permits the motor with its base and pivot shaft to be dragged toward the door 33 which normally closes the outer face of the portion 2, the pivot shaft 26 being of sufficient length to permit sliding of the motor in this manner.

The use of the hypoid gear permits the shaft 12 to be offset from the axis of the vertical hollow shaft 5 so that motion can be taken from the shaft 12 through a horizontal shaft 40 at one side of the hollow shaft 5 to a change gear mechanism enclosed within the compartment 42 of the box portion 15 opposite to the shaft 12.

The hollow vertical shaft 5 carries at its upper end the rotary cylindrical inner thread rolling die 45. This die rests upon a collar 46 supported upon a coolant deflecting ring 47 and is held clamped in position thereagainst by a nut 48 threaded on the upper end of the shaft 5. Collars 46 of various thicknesses can be employed selectively to fix the inner die 45 at the desired height corresponding to the distance from the head of the screw blank at which it is desired that the rolled threads terminate, this adjustment obviating any necessity of adjusting the height of the raceways, later described, which feed the blanks into position for presentation between the thread rolling dies. The outer dies which cooperate with the rotating die 45 are stationary segmental dies 50.

In order to substantially equalize the radial pressures on the central die produced by the rolling operation, it is desirable that a plurality of work pieces be rolled simultaneously, these work pieces being spaced angularly about the axis of the rotating die. As shown three stationary dies 50 are employed spaced angularly around this axis, and provision is made by which work pieces are presented substantially simultaneously between the central rotating die and each of these stationary dies. However, more or less than three stationary dies might be employed, depending upon the size of the work pieces in which threads are to be rolled, and also on the power applied to the machine. The greater the number of dies, the greater will be the required diameter of the rotating die, and consequently the power to drive it for the thread rolling operation in view of the longer lever arm occasioned by the increased radius of the rotating die required.

Each stationary die is clamped against a spacer 51, resting upon a segmental shelf 52 at the inner end of a die-holding block 55 and against an end abutment 53 secured to the block 55. Spacers 51 of various thicknesses corresponding to the thickness of the collar 46 which supports the rotary die may be employed, depending upon the closeness to the heads of the work blanks that the threading is desired. Each of the stationary dies 50 is clamped against its supporting spacer 51 as by means of a pair of screw clamps 56, each having a screw 57 threaded into the block 55, and an inward extension 58 overlying the top face of its stationary die (see particularly Figure 7).

Each die block 55 adjacent to each end portion is provided with a rear inclined face portion 60 which bears against the forward inclined face of a fulcrum pin 61. Each of these pivot pins 61 is mounted for vertical adjustment and this adjustment is effected by rotation of a screw 62 threaded into a vertical hole 63 in the corresponding block 55 and provided with a circular flange 68 which engages within a slot 64 in the forward inclined face 60 of the pivot pin 61. By turning the screw 62, which changes the elevation of its flange 68, the corresponding pivot pin 61 is raised or lowered, this permitting the block 55 carrying its segmental die 50 to be rocked about the pivot pin 61 at its opposite end. This permits either end portion of the stationary die to be adjusted toward and from the periphery of the central rotary die independently. When in adjusted position, the die block 55 is clamped firmly in position by tightening a socket head clamp screw 65 which passes therethrough and is threaded in a diagonal position into the top plate portion 66 of the base. This diagonal screw 65 clamps the stationary block 55 not only downwardly against supporting ribs 67 on the upper face of the plate portion 66, but also forces the block outwardly against the inclined face 60 of each of the pivot pins 61. In cases where it is desired that the threading be spaced below the heads of the work pieces further than permitted by the thickness of the washer 46 and spacers 51, thinner washers and spacers will be used, and filler blocks (not shown) will be inserted between the upper ends of the dies and the respective clamping devices, such as the nut 48 for the rotary die, and the clamps 56 for the stationary dies.

The stationary segmental dies 50 have thread-forming ridges in their inner or concaved faces, but these are of circular contour of a radius slightly greater than would correspond to their normal spacing from the axis of the rotary die 45. In other words, they are somewhat flatter than if they corresponded exactly to the distance of their inner face from the axis of the rotary die, and they are so adjusted relative to the center die that their circular axis is out of line with the axis of the rotary die. For example, as shown in Figure 7, the axis of the circular die is at O, while the axes of the stationary dies are located on the circle S. The stationary dies are adjusted angularly in such a manner that the entering ends where the work pieces are introduced between them are spaced from the periphery of the rotary die sufficiently so that the blanks may be entered therebetween freely for a slight distance. The space between the two dies then narrows to the point where the thread rolling is complete and where the spacing between the dies corresponds to the size desired for the finished work piece, this being preferably about four-fifths of the distance toward the exit end of the space between the rotary and stationary dies. During the remaining one-fifth of this distance, the spacing between the dies increases, thus relieving the pressure of the dies against the work preparatory to the work passing out of the space between the dies. This arrangement provides for a sufficient length of rolling contact between the dies and the work to progressively roll the threads as the work passes between them, giving sufficient time for this operation to be accomplished without subjecting the parts to too sudden and violent pressure changes.

It is important that the inner die spindle be mounted vertically so that conditions regarding the entrance of the screw blanks between the dies will be identical in all respects. If the spindle were inclined or horizontal, one blank might naturally lie at the correct angle but the rest would tend to tip in one way or another and thereby be cocked with respect to the inner die axis, resulting in a poor thread being rolled, damage to the dies, or both. With the vertical arrangement shown, however, the screw blanks are presented depending vertically, being engaged beneath their heads, so that they are all fed in the same relation to the dies. Furthermore, a vertical die spindle permits identical flushing and cooling action by the coolant with respect to all of the stationary outer dies. It will be noted that the top of the frame is dished to collect the coolant from which it may be drained at a suitable point back to the coolant supply.

The use of a hollow vertical die spindle allows also for symmetrical disposition of pusher mechanism by which the screw blanks are fed in between the dies. To this end the spindle 5 has journaled therein and coaxially therewith, a pusher actuating shaft 70 and as shown it is provided with upper and lower radial bearings 71 and 72 and its lower end is supported on a thrust bearing 73. Just above the upper end of the hollow shaft 5, the shaft 70 is provided with a liquid sealing ring 74. Above this liquid sealing ring there is keyed to the shaft 70 a spider 78 (see Figures 12 and 14). This spider 78 has a hub portion 79 on which is superposed a flanged collar 80 and a disk 81, the latter having a tooth portion 82. The disk 81 and the flanged collar 80 are pinned together as by the pin 83 for simultaneous turning about the hub 79. The spider 78 has journaled therein a short shaft 85 carrying teeth 86 thereon which meshes with the teeth of the disk 81. The lower end of the shaft 85 is formed with a projection 87 (see Figure 12) which rides within a slot 88 in one edge of the member 80, the ends of this slot forming stops to limit the amount of rotation of the parts 80 and 81 on the hub 79. The member 80 is provided in its flange with a downwardly projecting pin 90 for each of the outer stationary dies and each of these pins 90 engages in a slot 91 in the upper surface of a block 92 shown detached in Figure 15. This block 92 has recesses 93 in opposite ends and a central vertical opening 94. Each of these blocks 92 fits between a pair of spaced jaws 95 of the spider 78, but with capability of radial motion in these jaws as determined by the point of engagement lengthwise of the slot 91 of the corresponding pin 90 of the member 80. Thus by turning the shaft 85, which is provided with a screwdriver slot in its upper end for the purpose, the member 80 may be rocked so as to simultaneously adjust the several blocks 92 from and toward the axis of the shaft 70.

The block 92 has a guideway 97 extending longitudinally in its lower face and within this guideway rides the narrowed upper portion 98 of a block 100, this block 100 being provided with a pair of spaced ears 101 and a central vertical opening 102. A vertical screw 103 having its head resting upon a washer 104 extends loosely through the hole 94 of the block 92 and is threaded into the hole 102 of the block 100, so that the block 100 is allowed a limited adjustment lengthwise within the guideway 97 of the block 92. This adjustment may be produced by manipulation of a pair of screws 105 threaded through the ears 101 and engaging at their inner ends on the bases 106 of the recesses 93. By then tightening the screws 103 the block 100 may be held in its lengthwise adjusted position. It will be noted that the adjustment of each of the blocks is independent of all the other blocks, while the adjustment radially relative to the axis of the shaft 70 is simultaneous. Each of the blocks 100 carries a pusher finger 110 (see Figure 13) which extends down outside of the rotary cylindrical die 45 and in position to receive in front of it, and one by one, the blanks as they are delivered from a suitable hopper mechanism and to project the blanks into the space between the die 45 and one of the stationary outer dies at the entering end of the space therebetween in the direction of rotation of the inner die 45.

As shown best in Figure 13, the finger 110 is mounted for vertical or longitudinal adjustment in a suitable way in a portion 111 depending from the block 100, the fingers clamped in position by a clamping plate 112 secured by a clamping screw 113. This mounting provides against rocking motion of the finger about its axis lengthwise, but it will be evident that by rocking the shaft 70, each of the fingers may be projected into the entering end of the thread rolling space between the inner and one of the outer dies and then retracted therefrom. Each finger has a notch 114 in its forward face to receive the head of the blank, and engages the shank of the blank for a substantial distance, thus to insure proper angular presentation of the blanks to the dies. This pusher mechanism comprising the pusher fingers and their mounting may be removed as a unit from the upper end of the shaft 70 by removal of the externally tapered nut 120 threaded on the upper end of the shaft 70. The member 78 is keyed to the shaft 70 so that it can be associated therewith in one definite angular position only.

The shaft 70 is rocked in suitable timed relation to the rotation of the inner cylindrical die by mechanism driven from the shaft 40, and provision is made by which this shaft 70 is rocked so that when the work pieces become gripped between the dies for the thread rolling action, each reaches this position at a projected velocity which is substantially that of the progress of the work piece between the dies, that is, at the rate at which the axis of each work piece travels while the work piece is being rotated and propelled between the dies by the rotation of the inner die, and it is important that this projecting action take place at the proper times in the rotation of the central die in order that its thread-forming ridges may be in phase with those of the stationary cooperating dies.

The mechanism driven from the shaft 40 which rocks the pusher shaft 70 is shown best in Figures 4, 17 and 18. The shaft 40 is coupled to a stub shaft 130 extending through a gear box 131. This shaft 130 on its outer end carries a change gear 132. This meshes with a second change gear 133 on a stub shaft 134 journaled in a box 135 carried by an arm 136 fulcrumed about the axis of the shaft 141 and adapted to be fixed in adjusted angular position by a clamp screw 137 which passes through a slot 138 in the arm 136 and is threaded into a stationary frame part. This idler gear 133 on the shaft 134 meshes with a third change gear 140 on a shaft 141. This shaft 141 also carries a pinion 142 which meshes with a gear 143 keyed to the cam shaft 145. To the outer end of this cam shaft 145 is keyed a tapered sleeve 146 with the large end of which is engaged a washer 147 having a beveled face 148 engaged by the mating bevel portion on a nut 149 threaded onto the outer end of the shaft 145. This tapered sleeve 146 engages on its tapered face an internal reversely tapered portion 150 of a cam 151. This cam has a cam face 152 which faces inwardly and with which cooperates a follower roll 155 journaled on one end of a lever 156. This lever 156 is fulcrumed intermediate its ends, as on the stub shaft 157, and its outer end is pivotally connected through an adjustable link 158 with a crank arm 159 clamped to the lower end of the pusher shaft 70. The cam follower roll 155 is held yieldingly against the face 152 of the cam, as by means of a compression spring 160 reacting against the lever 156, being seated within a socket 161 therein as shown in Figure 21. The outer end of the spring 160 engages an adjustable abutment 165 shown as threaded into the outer wall plate 166 and adjustable by turning to vary the tension of the spring 160. This spring is employed to actuate the pusher elements in operative direction, thus providing a yielding pressure which protects the mechanism against excessive pressure and permits the pusher fingers to yield on any unusual obstructive interference with their proper operation. The return stroke of the pusher mechanism is accomplished positively by the cam 151.

Means are provided by which this pusher mechanism may be rendered inoperative and the cam out of action when desired, as when setting up the machine. This means comprises a vertical rod or shaft 170 journaled in the wall of the frame and in a bearing 171 near its outer end. This shaft or rod 170 has a handle 172 secured to its upper end by which it may be rocked and its lower end has fixed thereto a cam 175 shown detached in Figure 20. This cam has an edge cam face 176 which may at times engage the pivot 180 which connects the link 158 with the lever 156. The cam 176 also carries an upstanding pin 182 over which engages a perforation therein, one end of a link 185. The rear end of this link is formed as a reduced diameter shank portion 186 which is surrounded by a coil spring 187 reacting at one end on a shoulder 188 on the link and at the other end on a vertical shaft 189 through a perforation 190 in which the shank 186 is slidable.

In the position shown in Figure 21 the cam 175 is out of engagement with the pivot shaft 180, but by turning the shaft 170 in counterclockwise direction against the pressure of the spring 187, the cam face 176 may be pressed against the pivot pin 180 in a direction to swing the lever 156 toward starting position for the work piece pushing mechanism, and when in the position substantially 180° from that shown in Figure 21, the pusher mechanism is retained in inoperative position by the spring 187. When a pointer on the handle coincides with a "Set-up" position on a scale beneath, the cam follower roll has been raised to about one-third of that portion of the pusher cam profile which oscillates the pusher in differential speed at which it is desired to cause the work pieces to be moved when they are gripped by the dies. A flat 183 on the cam then engages a flat 184 on the pivot 180, being there held by the spring 160 which is stronger than the spring 187.

When setting up a new set of dies, the operator inserts a thread gage or plug between the inner and one of the outer dies. The center die being turned, the two dies are in phased relation when the gage or plug is properly gripped by the dies. This is the point where it is desirable that the blanks be traveling at the differential speed. With the proper change gears in place, the operator, who has previously loosened the pusher cam by loosening the nut 149, revolves the cam 151 in the direction it normally rotates until the cam profile contacts the follower roll. The parts are then in correct position for the cam to be tightened with assurance that the dies and the work are in phase. Any slight inaccuracies in phase between the several sets of dies is then corrected by adjustment of the pushers tangentially as has previously been described, this adjustment being minor. If the operator should accidentally start the machine under power without retracting the jack, the over-center spring 187 and rod 185 will cause this cam to rotate and follow the rocker 156 to the end of its stroke and stop there, thus preventing the pusher cam from repeatedly knocking against the cam pusher roll in approximately mid-stroke.

If it is desired to run the machine without feeding screw blanks to the dies, the operator places the handle 172 in registration with the "Stop feed" mark on the scale, in which position the jack cam 175 has raised the cam follower roll completely free of the pusher cam. In normal operation the handle pointer is returned to the "Run" position shown in Figure 21, in which case the jack cam 175 completely clears the rocker arm where it is held by the spring 187.

The screw blanks are fed to starting position between the dies from suitable hopper mechanisms shown at 200 there being one such hopper mechanism for each of the stationary dies, but as these mechanisms per se do not constitute a part of the present invention, they are not described in detail herein. It is sufficient to say that the blanks are delivered from the hopper mechanisms to downwardly inclined raceways 201, as shown, for example, in Figure 9, where a work blank is shown at W, its head resting upon spaced side rails 202 and 203 of the inclined track. A top strip 204 is secured in spaced relation above the head of the work piece in order to hold the work pieces in line in the proper series. The lower end of each raceway is formed as a separate set of rails 205 and 206, these being supported on the stationary die block 55 for each of the stationary dies.

The work pieces are taken from the lower end of the raceways one at a time by the pusher fingers and at each pusher actuation, a screw blank is fed into position between each of the stationary dies and the revolving center die, and with the three stationary dies shown, at least six screw blanks are always embraced by the outer dies at any given instant when the hoppers are feeding screw blanks at their maximum and intended rates. The extent of feed motion of each pusher finger is such, as shown in Figure 7, that the blank impinges on its side face, or in front of it, but never back of it. A succeeding set of blanks are introduced between the dies just as the second preceding set leaves them at the exit end of the space between the stationary and movable dies. These blanks as they leave the space between the dies, at which time the threads are completely rolled thereon, impinge against baffle plates, one of which is shown at 220 in Figure 7, and these baffle plates guide the completed screws outwardly and discharge them into the downwardly inclined perforated chutes 221 as shown in Figure 11. The perforations in these chutes allow the coolant to drain from the screws as they pass down the chutes and they pass from the chutes 221 through continuation chutes 222 formed as integral portions of outer wall plates 223 of the machine and are discharged into suitable receptacles such as 225 carried on table brackets 226. Further coolant draining from the completed screws and from the receptacles 225, which are preferably perforated, at least at their lower ends, is conducted back to the coolant supply for recirculation, as through the pipe connections 227.

Assuming, for example, the use of three stationary dies, as shown, for rolling threads on a $\frac{5}{16}$ inch screw with eighteen threads to the inch, the pitch diameter of such a screw is .2764 inch and the inner die pitch diameter must be a whole multiple of the work pitch diameter. Since this machine has three outer dies, the multiple of the work pitch diameters must be divisible by three in order that three screw blanks may be equally disposed angularly around the inner die. 21 thread starts is a number which suits this requirement. The pitch diameter of the inner die is therefore twenty-one times .2764 or 5.8048 inches. The number of thread starts in each outer die will be 21 plus 2, or 23 starts. Assuming $n$ is the number of thread starts of the inner die, the number of thread starts in each outer die will be $n+2$, and each outer die is a segment of an annulus having $n+2$ thread starts. The pitch diameter of each outer die will be twenty-three times .2764 or 6.3572 inches. The planetary ratio is 21 divided by 21 plus 23, or .477 to 1. This means that the axis of each screw travels .477 revolution around the inner die axis when the inner die rotates one revolution. The number of revolutions of the work about its own axis is unimportant so far as phasing relations are concerned. The die size range is so chosen that this differential ratio remains about the same for all sizes of screws intended to be rolled by one machine. This is so that the profile of the cam which is used to project the work-engaging fingers can be designed to provide a short acceleration period to enable the pusher to acquire the differential speed, then a section of cam profile where this differential speed is maintained for a distance of screw travel wherein the work blanks are gripped by the dies, and finally a section of cam profile where the pusher is decelerated and quickly returned to the starting position to receive a subsequent blank. In order to eliminate the necessity for exact timing of the gripping of the screws between the dies, the differential section of the cam profile is made long enough so that the pusher finger travels about a ¼" at this differential speed. As long as the screw blank is gripped by the dies anywhere within this extent of motion, the blank will be engaged by the dies when they are in phased or matched relationship, provided they have been so set up initially. In single or odd numbers of threads, the phased or matched relationship exists when the crests or ridges of one of the dies is exactly opposite to the roots of the cooperating die, and the axis of the work blank is in the same plane therewith. In the case of an even number of threads being rolled, phased or matched relationship between the cooperating dies takes place when the crests or ridges of one are opposite to the crests or ridges of the other and the axis of the work blank is in the same plane.

This machine is capable of a high rate of production. For example, the pusher oscillations may be as high as 262 per minute, in some size of screws, the production then amounting to 786 screws a minute. When rolling threads in heat treated blanks, the feeding strokes are reduced to half, skipping every other feeding stroke, by substituting a single-lobe pusher cam for the two-lobe cam shown herein. Change gears are provided so that successive strokes of the pusher may be made to occur at the same position with respect to the thread starts on the inner die. For any particular diameter and pitch of screw being rolled, only one train of gears would be needed, but in order that the machine may accommodate a range of screw sizes, the change gears are provided.

From the foregoing description of an embodiment of this invention, it should be evident to those skilled in the art that various changes and modifications might be made without departing from its spirit or scope.

I claim:

1. In a thread rolling machine, a hollow rotary cylindrical thread rolling die, an arcuate die spaced from said rotary die and having a thread rolling concave face spaced from the periphery of said rotary die, a member coaxially mounted and extending through the hollow of said die for oscillation about the axis of said rotary die, a block carried by said member for adjustment radially of said axis, an element carried by said block for adjustment relative thereto tangentially of said rotary thread rolling die, a stock pusher finger carried by said element and extending adjacent to the periphery of said rotary die adjacent to the entering end of the space between said dies in the direction of motion of the periphery of said rotary die, means for delivering work blanks one by one in front of said finger, and means for oscillating said member to cause said finger at suitable times to project said blanks into said space.

2. In a thread rolling machine, a rotary cylindrical thread rolling die, power means for continuously rotating the die an arcuate die spaced from said rotary die and having a thread rolling concave face spaced from the periphery of said rotary die, a member mounted for oscillation about the axis of and extending through said rotary die, a block carried by said member adjacent one side of the rotary die for adjustment radially of said rotary die axis, an element carried by said block for adjustment relative thereto tangentially of said rotary die, a stock pusher finger carried by said element and extending adjacent to the periphery of said rotary die adjacent to the entering end of the space between said dies in the direction of motion of the periphery of said rotary die, means for delivering work blanks one by one in front of said finger, and means driven by the power means for oscillating said member to cause said finger at suitable times to project work pieces into said space, said finger being mounted on said element for longitudinal but non-rotative adjustment relative thereto.

3. In a thread rolling machine, a hollow rotary cylindrical thread rolling die arranged for rotation about a vertical axis, a stationary arcuate die spaced from the periphery of said rotary die, a member extending coaxially through said rotary die and mounted for oscillation about its axis, a stock pusher finger extending adjacent to the periphery of said rotary die adjacent to the entering end of the space between said dies and operatively connected to said member above said rotary die, means for delivering work blanks one by one in front of said finger, and means operatively connected to said member beneath said rotary die to oscillate said member to cause said finger at suitable times to project said blanks into said space.

4. A thread rolling machine having a rotary cylindrical thread rolling die, a segmental stationary die having a concave thread rolling surface spaced from the periphery of said rotary die for the passage of a work piece to be threaded therebetween, a stock pusher mounted to project a work piece between said dies and to retract therefrom, an oscillatable mounting supporting the pusher, an oscillatable actuating means driven in timed relation with the rotation of said rotary die including cam means for moving said pusher and having a cam face portion shaped to cause said pusher to move during a portion of its pushing stroke at substantially the differential speed of the threading surfaces of said dies, said cam means being adjustable to vary the terminal point of feeding motion of the pusher, a manually operated means including a stop cam having a pair of operative positions with which said oscillatable pusher actuating means may cooperate to hold said pusher selectively retracted or in position to enter a work piece between said dies and said stop cam having an inoperative position in which it has no effect upon said pusher actuating means, and yieldable means tending to retain said stop cam in any of such positions in which it may be placed.

5. In combination in a thread rolling machine, a circular thread rolling die mounted for rotation on a vertical axis, a plurality of stationary arcuate dies spaced from said circular die and having thread forming faces facing said circular die, means for continuously rotating said circular die, an oscillatable member associated with each stationary arcuate die for projecting work blanks between said circular die and said stationary dies to be gripped therebetween for the thread rolling operation, an oscillatable means swinging about a center which is coincident with the center of the rotary die operatively supporting said members, and means for actuating said oscillatable means to cause the members to project said work pieces at the time of initial contact of the work pieces with the dies at a velocity substantially equal to that of the axes of said work pieces during the thread rolling operation into gripping relation between the cooperating dies.

6. In combination, a pair of oppositely facing thread rolling dies, means for rotating one of said dies relative to the other to perform thread rolling operations, and oscillating means including work blank pushers oscillatable in timed relation to the rotation of said rotary die about the axis of the rotary die for projecting said work pieces between said dies at the time of initial contact of the work with the dies at a velocity substantially that of the axis of the work piece as it is moved between said dies during the rolling operation, the operation of said work blank pushers being timed relative to the rotation of the rotary die to cause said work pieces to be gripped when the dies are in phased relation.

7. A thread rolling machine having a machine frame, a rotary thread rolling die operatively supported by the frame, a segmental die having a concave rolling surface matched to the thread forming surface of the rotary die, the segmental die being supported by an adjustable block secured to the frame, fulcrum structures provided at opposite ends of the block adjacent the ends of the supported segmental die, each of said fulcrum structures including an adjustable pin tapered on one side to engage a tapered surface on the block and a rounded rocker bearing surface in engagement with a complementary surface on the machine frame and means for adjusting each pin independently of the other pin to thereby rock the segmental die about the fulcrum surface of the other pin to effect adjustment of the segmental die relative to the rotary die.

8. A thread rolling machine having a machine frame, a rotary cylindrical thread rolling die, a segmental stationary die provided with a concave thread rolling surface spaced from the periphery of said rotary die, a block supported on the frame and supporting said segmental die, a fulcrum member disposed between the frame and said block back of each end of said segmental die for rocking motion on the frame toward and from said rotary die, one face of each fulcrum member being inclined, said block having a complementally inclined face engaging each fulcrum means for adjusting each fulcrum structure axially independently of the other fulcrum member and means for clamping said block against said support and against said inclined faces of said fulcrum members.

9. A thread rolling machine having a rotary cylindrical die, a stationary segmental die having a concave thread rolling face spaced from the periphery of said cylindrical die, a die carrying block supporting the segmental die and adjustable relative to the rotating center of the cylindrical die, said concave face being a segment of an internally threaded annulus and of a radius slightly larger than its setting with relation to the axis of said cylindrical die and with its axis offset from that of said cylindrical die such that the starting end of said die is opened radially from the cylindrical die to admit a blank to be rolled therebetween and the opposite end of said segmental die is more widely spaced than at its intermediate portion from said cylindrical die to provide relief of the pressure of the dies on the work after the thread rolling has been completed.

10. A planetary thread-rolling die system comprising an externally multiple-threaded cylindrical die having its pitch diameter a whole multiple of the pitch diameter of the screw to be rolled, and a plurality of segmental outer dies each of the same thread pitch as said cylindrical die and comprising segments of an internally threaded annulus positioned in a symmetrical array around the cylindrical die and threaded internally with a multiple thread, the cylindrical die having a number of threads forming a whole multiple of the number of segments and the segmental outer dies having two more threads than the cylindrical die, and each segment having a thread rolling radius slightly larger than its setting with relation to the cylindrical die and with its axis offset from the axis of the cylindrical die.

11. A planetary thread-rolling die system having a rotating central multiple-threaded cylindrical die, an internally multiple-threaded outer die of the same pitch as said cylindrical die divided into a plurality of segments, and a plurality of work-introducing members movable in the space between the central and outer dies at the normal rolling speed of the work blank to introduce work blanks between the dies, and an oscillating member centered at the center of the central die supporting the work introducing members and yieldingly oscillated in timed relation to the rotating movement of the threads of the rotating central die for moving the members to introduce the work blanks between the dies when the thread elements on one die are 180° out of phase with those thread elements on the other die directly across the work piece.

12. A thread rolling machine having a rotary cylindrical thread rolling die, a segmental stationary die having a concave thread rolling surface spaced from the periphery of said rotary die for the passage of a work piece to be threaded therebetween, an oscillating stock pusher mounted to project a work piece between said dies and to retract therefrom, an oscillating mounting for the pusher, having its center of oscillation located at the center of the cylindrical die, an actuating means for the mounting including a cam means driven in time with the rotation of said rotary die for oscillating said mounting and pusher and having a cam face portion shaped to cause said pusher to move during a portion of its pushing stroke at substantially the differential speed of the threading surfaces of said dies, said cam means being adjustable and manually operated means for selectively holding said pusher in position to enter a work piece between said dies while said cam means is adjusted to bring said shaped portion into operative relation to said pusher in setting up the machine.

13. A planetary thread rolling machine comprising a central cylindrical multiple-threaded die, driving means for continuously rotating the central die, a plurality of identical segmental dies surrounding the central die, said segmental dies being fixed in position circumferentially of the central die but adjustable toward and from it, the number of threads on the central die being exactly divisible by the number of segments and the segments being multiple threaded and comprising sections of an internally threaded annulus having two more threads than the number of threads on the central die, said segments being angularly equally spaced about the central die and each segment being symmetrical about its midline, a pusher associated with each segment and mounted for movement from a position adjacent the entrance between said die and segment to a position between the die and segment, an oscillating pusher supporting means having the center of oscillation thereof coincident with the center of rotation of the central die, yieldable means driven by the central die driving means for oscillating the pusher supporting means and the pushers simultaneously in timed relation to the rotation of the central die at a speed which equals the advancing speed of a work blank when being thread rolled and said driven means including adjustable means to vary the terminal point of oscillation termination of the pushers relative to said die entrance.

14. A planetary thread rolling machine comprising a central cylindrical multiple-threaded die, rotatable on a substantially vertical axis, power means for continuously rotating the central die, a plurality of identical segmental dies surrounding the central die, said segmental dies being fixed in position circumferentially of the central die but adjustable toward and from it, the number of threads on the central die being divisible by the number of segments and the segments being multiple threaded and comprising sections of an internally threaded annulus having two more threads than the number of threads on the central die, said segments being angularly equally spaced about the central die, a pusher associated with each segment and mounted for oscillating movement from a work blank receiving position adjacent the entrance between said die and segment to a position between the die and segment, actuating means for oscillating the pusher supporting means and said actuating means including adjusting means to vary the terminal point of forward feed movement of the pushers relative to the die entrance.

JAMES W. BATCHELDER.

References Cited in the file of this patent

UNITED STATES PATENTS

| Number | Name | Date |
|---|---|---|
| 295,605 | Wilson et al. | Mar. 25, 1884 |
| 1,684,799 | Kochendorfer | Sept. 18, 1928 |
| 1,699,033 | Smith | Jan. 15, 1929 |
| 2,065,066 | Freter et al. | Dec. 22, 1936 |
| 2,111,096 | Fritzsch | Mar. 15, 1938 |